E. L. TOWLE.
SAND MOLDING APPARATUS.
APPLICATION FILED MAY 13, 1919.
1,407,902.
Patented Feb. 28, 1922.
2 SHEETS—SHEET 1.
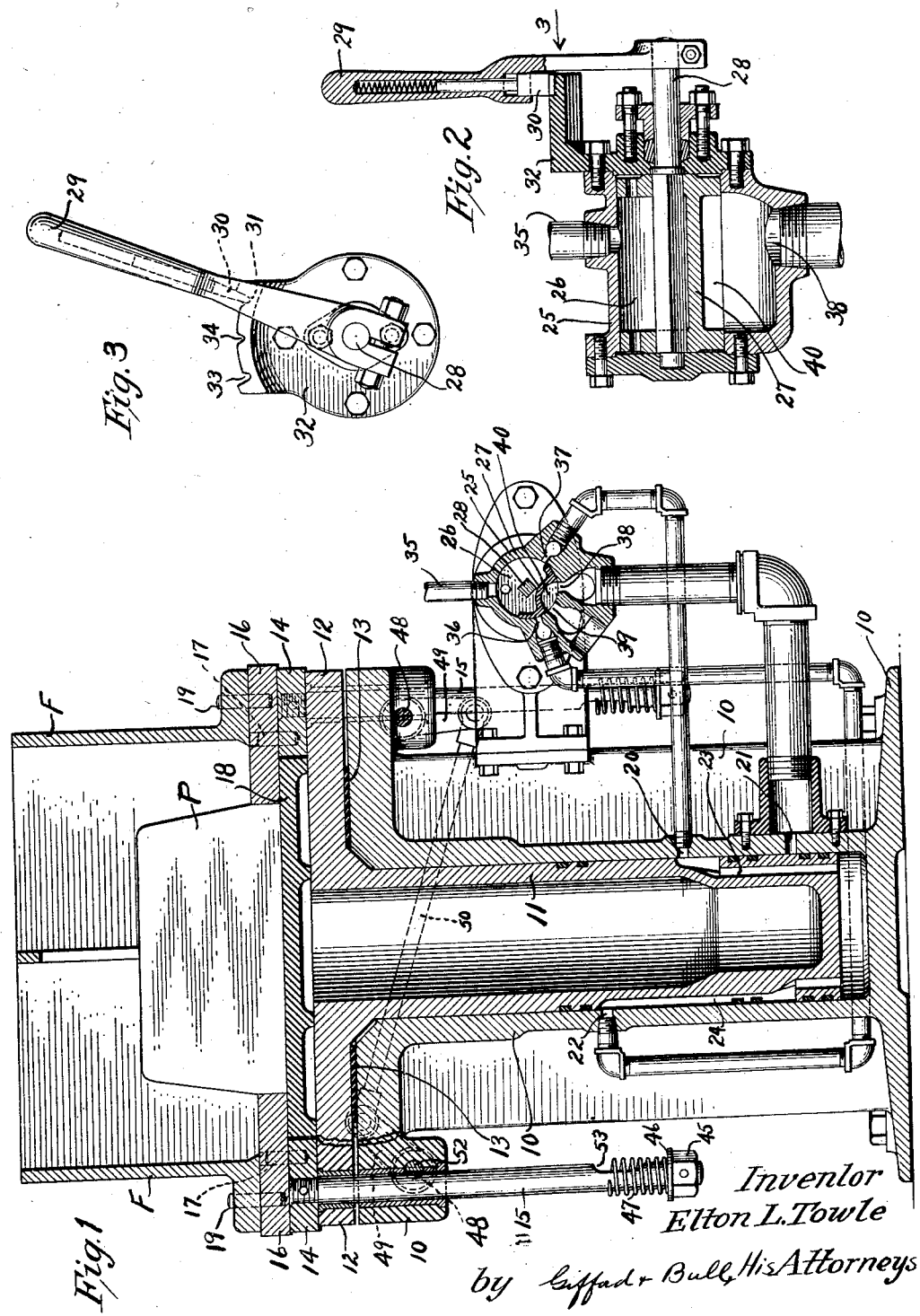
Inventor
Elton L. Towle
by Giffard & Bull, His Attorneys

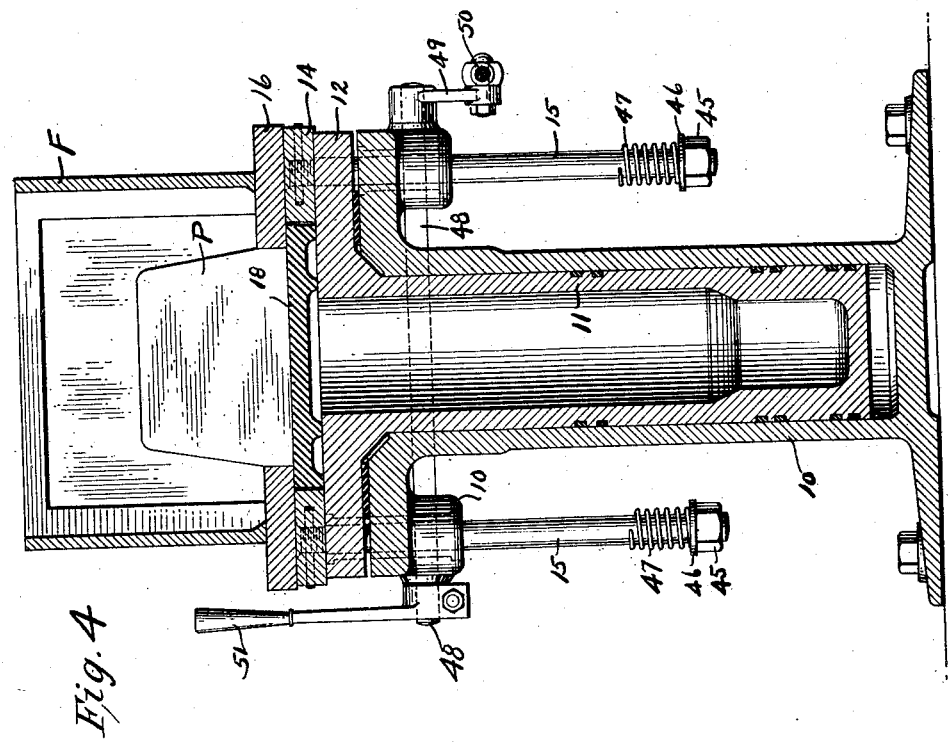

UNITED STATES PATENT OFFICE.

ELTON L. TOWLE, OF PATERSON, NEW JERSEY.

SAND-MOLDING APPARATUS.

1,407,902.   Specification of Letters Patent.   Patented Feb. 28, 1922.

Application filed May 13, 1919. Serial No. 296,816.

*To all whom it may concern:*

Be it known that I, ELTON L. TOWLE, a citizen of the United States, residing at Paterson, in the county of Passaic and State of New Jersey, have invented certain new and useful Improvements in Sand-Molding Apparatus, of which the following is a specification.

This invention relates to sand molding machines of the type in which the mold is rammed by a jolting action and then the pattern is drawn automatically from the mold.

One of the objects of my invention is to provide such a machine in which the stripping of the mold and pattern may be done efficiently and without any great care on the part of the operator. Another object of my invention is to provide a machine in which a fluid pressure can be used both for jolting the mold and for lifting it high enough so that the pattern may be withdrawn from the mold when the latter is held in its uppermost position. Another object of my invention is to provide such a machine with controlling mechanism for the fluid pressure of such a character that the simple operation of a single lever will suffice to bring about the various successive actions of the machine without possibility of conflict therein. With these and other objects in view my invention consists of certain novel features of construction, combination and arrangement of parts as will be more fully described and pointed out in the appended claims.

In the drawings Figure 1 is a vertical sectional view of the form of machine which I have adopted for illustrative purposes, this section being taken along the center line of the machine except one portion, this latter being taken through one of the stripper rods located at one side of this middle section; Fig. 2 is an enlarged vertical section looking toward the side of the valve shown in Fig. 1; Fig. 3 is a view of the valve shown in Fig. 2 looking in the direction of the arrow 3; Fig. 4 is a vertical section through the center line of the machine taken at right angles to the section of Fig. 1. The corresponding parts are referred to both in the drawings and in the specification by similar reference characters.

In the illustrative form of machine 10 is the base or body portion having a cylindrical opening therein at its center. Slidably mounted in this opening is a plunger 11 provided with suitable piston rings and expanded at its top to form a table 12. Normally, this table is in the position shown in Figure 1, resting on pieces of fibre 13 on the upper portion of the base 10.

The top of the table 12 may be of any suitable shape and dimensions and in the form illustrated it is rectangular with the length shown in Figure 1 and the width in Figure 4.

On the table 12 is supported a stripping means which in the form illustrated comprises a member 14 of the same general shape as the table 12 but having a cut away portion at its center for a purpose to be described hereinafter.

At each corner of the table 12 and of the member 14 I provide stripper rods 15, each being permanently attached to the member 14 and extending through suitable openings in the table 12 and the base 10. If desired, bushings may be provided in the table 12 and the base 10 through which the rods 15 are free to move.

On the member 14 I provide a stripper plate 16 which by means of dowels 17 is definitely located in relation thereto and in fact operates as a part of the stripping means.

In the opening in the member 14 is a pattern plate 18 resting on the table 12 to which may be attached the pattern which I have shown in a conventional manner as at P. The stripper plate 16 has a suitable opening for the pattern P to act in the well-known manner to form a parting line in the sand.

A flask F is located on the stripper plate 16 and is located thereon by suitable dowels 19.

In order to provide means for jolting the sand and for elevating the flask so that the pattern may be drawn, I prefer to use compressed air acting beneath the bottom of the plunger 11. As a convenient and simple means in which to carry out this purpose I first provide in the cylinder 10 a number of ports located at different heights. 20 is the port through which the air passes when the table is being jolted. 21 is an exhaust port through which the air passes out of the cylinder 11 at selected times. 22 is an elevating port through which the air passes when it is desired to raise the table 12 to the highest point. The plunger 11 is provided with channels 23 and 24 leading respectively from the ports 20 and 22 to the lower side of the plunger 11 when the latter is in its lowermost position. At this time the plunger is so constructed as to close the port 21. It will be noted that these ports are located at different heights for a purpose to be hereinafter described.

As a convenient and simplified means for controlling the entrance and the exit of the air to the cylinder 10 for the various purposes desired, I provide a single multiple-way valve which in the form illustrated is of the cylindrical type having a casing containing a number of ports and a body member rotatably mounted in the casing and having suitable recesses and cylindrical portions to act to close or open the several ports in the various positions of the valve.

In the illustrative form, the casing 25 has a cylindrical opening 26 in which is mounted a cylindrical body member 27 on the shaft 28, the latter being controlled by a handle 29 which has a detent 30 adapted to hold the handle 29 in any one of three positions. In the position shown in Figure 3 with the detent 30 engaging a notch 31 in the member 32 the valve 27 is set so that the table is jolted. When the handle is turned so that the detent 30 engages with the notch 33 then the valve 27 is set in a position in which the table is elevated and maintained in this elevated position. When the detent 30 engages the notch 34 the entrance of air to the cylinder 10 is cut off and the exhaust ports are open so that the table 12 may drop and remain in the lowermost position.

In the casing 25 and communicating with the cylindrical opening 26 is a pipe 35 connected to any suitable source of fluid pressure as an air compressor. Connected to the port 22 by suitable piping is an elevating port 36 in casing 25. Connected to the jolting port 20 by suitable piping is a jolting port 37 in casing 25. Connected to the exhaust port 21 is an exhaust port 38 in casing 25. This casing is also provided with a final exhaust port 39 and the body member 27 is provided with recess 40.

In the position shown in Figure 1 with the pattern and flask in place, the handle 29 is turned so that the valve 27 is set in the position shown in Figure 1. Air pressure passes from the pipe 35 through the port 37 and from thence through the port 20 and the channel 23 beneath the plunger 11. The plunger is then elevated until the exhaust port 21 is opened and the pressure is thereupon relieved to permit the table to drop back and be jolted by contact with the fibre pieces 13 on the base 10. The air from the port 21 passes out through the exhaust port 38, the recess 40 and the final exhaust port 39. So long as the handle 29 is in this position the jolting of the flask will continue.

When the sand has been rammed, the handle 29 is turned until the detent 30 engages with the notch 33. When in this position the port 37 and final exhaust port 39 are covered by the body member 27 and the port 36 is open to the cylindrical opening 26. Air pressure passes from the pipe 35 through port 36, port 22, recess 24 to raise the plunger 11 until stopped by mechanism to be described later. The air cannot pass out of the ports 20 and 21 because of the closure of the corresponding ports in the valve.

On the ends of each of the stripper rods 15 I provide permanent stops in the form of nuts 45 and also washers 46 and short springs 47. As the table 12 is raised, the springs 47 contact with lugs on the base 10 to prevent undue jarring and the permanent stops 45 prevent the table from being raised unduly.

I provide locking means for locking the stripper rods 15 and the parts carried thereby in their uppermost position. These locking means may be widely varied but in the form illustrated they consist of a pair of shafts 48 extending across the machine and mounted in suitable bearings in the base 10. Each of these shafts is provided with levers 49 which are connected by a link 50. One of these shafts is provided with a handle 51 the turning of which will cause the two shafts 48 to be rotated through the levers 49 and the link 50. It will be noted that the shafts 48 intersect the rods 15 and in order to permit the rods 15 to pass I cut away a portion of the shafts 48, as shown in Figure 1, leaving a half round portion 52. On the lower portion of the rods 15 I cut a recess 53 of such a form that when the rods 15 are raised to their highest position, the shafts 48 may be rotated so as to bring the half round portion 52 against the end of the recess 53 thus locking the rods 15 in their highest positions.

With the rods 15 so locked, the handle 29 is turned to bring the detent 30 into the notch 34. This turns the body member 27 so that the ports 36 and 37 are covered while the recess 40 still connects the ports 38 and 39. Consequently, all air pressure beneath the plunger is cut off and the air therein is permitted to pass out through the ports 21, 38 and 39, thus allowing the plunger 11 and the table 12 to return to the normal position shown in Figure 1. Since the rods 15 are locked against such return, however, there results a drawing of the pattern from the mold since the pattern and its plate 18 rest upon and may be attached to the table 12 while the stripper plate 16 and the flask F are held in the uppermost position by the locking of the rods 15.

The flask is now removed and an empty flask substituted therefor. Before the handle 51 is turned to unlock the rods 15, to permit the parts to return to the position of Fig. 1, I prefer to again raise the table 12 until it supports the plate 14 and the empty flask. Then, when the handle 29 is turned to release position, the parts drop as the air passes from beneath the plunger.

While I have illustrated my preferred form, it is obvious that the arrangement may be varied within wide limits.

What I claim and desire to secure by Letters Patent of the United States is:—

1. In a combination jolt-ramming and stripping machine, a table having a plunger attached thereto, said table being adapted to carry the pattern and the flask, stripping means supported on said table and adapted to move independently thereof, a cylinder for said plunger and means to admit fluid pressure beneath said plunger, comprising ports in said cylinder and a multiple-way valve constructed and arranged to admit the fluid pressure to jolt said table when the valve is in the first position, and to elevate said table to a greater distance and to hold it in such elevated position when the valve is in the second position and to release the pressure to permit said table to drop when the valve is in the third position, said stripping means including vertical rods provided with stops to limit the upward motion of the table, and means engaging said rods to lock said stripping means in its highest position when said table is permitted to drop, and elastic means to act as a buffer when the table reaches its upper position.

2. In a combination jolt-ramming and stripping machine, a table having a plunger attached thereto, said table being adapted to carry the pattern and the flask, stripping means supported on said table and adapted to move independently thereof, a cylinder for said plunger and means to admit fluid pressure beneath said plunger, comprising a jolting port, an elevating port and an exhaust port in said cylinder and a multiple-way valve between a source of fluid pressure and sand ports, said valve being constructed and arranged, when in its first position, to connect said source of pressure with said jolting port and to open said exhaust port and close said elevating port, and when in its second position, to connect said elevating port with said source and to close said jolting port and said exhaust port, and when in its third position, to open said exhaust port and to close said elevating and said jolting ports, and means to lock said stripping means in its highest position when said table is permitted to drop.

3. In a combination jolt-ramming and stripping machine, a table having a plunger attached thereto, said table being adapted to carry the pattern and the flask, stripping means supported on said table and adapted to move independently thereof, a cylinder for said plunger and means to admit fluid pressure beneath said plunger, comprising a jolting port, an elevating port and an exhaust port in said cylinder and a multiple-way valve between a source of fluid pressure and said ports, said valve having a casing with a cylindrical opening therein, and a jolting port, an exhaust port and an elevating port opening into said cylindrical opening, each connected by suitable piping to the corresponding ports in said cylinder, said cylinder opening also being provided with a connection to a source of fluid pressure and a final exhaust port, a cylindrical body member rotatably mounted in said opening and having a recess in its surface, said body member being constructed and arranged to be rotated successively from first, to second and to third positions and to open said jolting port and said exhaust and final exhaust ports through said recess when in first position, to close said jolting port and said exhaust ports and to open said elevating port when in second position, and to close said jolting and said elevating ports and to open said exhaust and final exhaust ports through said recess when in third position, and means to lock said stripping means in its highest position when said table is permitted to drop.

4. In a combination jolt-ramming and stripping machine, a table adapted to carry the pattern and the flask, means to elevate said table and permit it to drop, stripping means supported on said table and interposed between the flask and said table and adapted to move independently thereof, said stripping means including a plurality of supporting rods connected thereby, a plurality of locking devices adapted to lock said stripping means in its highest position when the table is permitted to drop, a handle and connections between it and each said locking devices.

E. L. TOWLE.